United States Patent
Vinton et al.

(10) Patent No.: US 6,517,108 B1
(45) Date of Patent: Feb. 11, 2003

(54) PYROTECHNIC AIR BAG STITCH VENT

(75) Inventors: Jeffrey Steven Vinton, Farmington Hills, MI (US); Stephen Hongbin Kang, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,453

(22) Filed: Jan. 2, 2002

(51) Int. Cl.[7] .............................................. B60R 21/28
(52) U.S. Cl. ...................................... 280/739; 280/735
(58) Field of Search ................... 280/735, 739

(56) References Cited

U.S. PATENT DOCUMENTS

| | | |
|---|---|---|
| 3,884,499 A | 5/1975 | Oka et al. |
| 3,944,250 A | 3/1976 | Wulf et al. |
| 4,071,187 A | 1/1978 | LaFleur |
| 4,097,065 A * | 6/1978 | Okada et al. ............... 280/739 |
| 4,111,458 A * | 9/1978 | Okada et al. ............... 280/739 |
| 4,532,652 A | 7/1985 | Herrington |
| 4,805,930 A * | 2/1989 | Takada ........................ 280/739 |
| 4,877,264 A | 10/1989 | Cuevas |
| 5,004,123 A | 4/1991 | Stoody |
| 5,007,662 A | 4/1991 | Abramczyk et al. |
| 5,044,663 A | 9/1991 | Seizert |
| RE33,938 E | 5/1992 | Cuevas |
| 5,161,776 A | 11/1992 | Nicholson |
| 5,219,179 A * | 6/1993 | Eyrainer et al. ............ 280/739 |
| 5,234,229 A | 8/1993 | Gordon |
| 5,280,953 A | 1/1994 | Wolanin et al. |
| 5,310,215 A | 5/1994 | Wallner |
| 5,332,257 A | 7/1994 | Rogers et al. |
| 5,332,259 A | 7/1994 | Conlee et al. |
| 5,340,151 A | 8/1994 | Sato |
| 5,366,242 A | 11/1994 | Faigle et al. |
| 5,398,960 A | 3/1995 | Ravenberg et al. |
| 5,439,032 A | 8/1995 | Petrone |
| 5,478,111 A | 12/1995 | Marchant et al. |
| 5,492,364 A | 2/1996 | Anderson et al. |
| 5,531,476 A | 7/1996 | Kerner |
| 5,603,526 A | 2/1997 | Buchanan |
| 5,634,659 A | 6/1997 | Abraham |
| 5,647,607 A | 7/1997 | Bolieau |
| 5,664,802 A * | 9/1997 | Harris et al. ............... 280/736 |
| 5,664,807 A | 9/1997 | Bohmler |
| 5,669,628 A * | 9/1997 | Kaufmann et al. ......... 280/739 |
| 5,681,052 A | 10/1997 | Ricks et al. |
| 5,695,214 A | 12/1997 | Faigle et al. |
| 5,704,639 A * | 1/1998 | Cundill et al. ............. 280/739 |
| 5,743,558 A | 4/1998 | Seymour |
| 5,762,364 A | 6/1998 | Cuevas |
| 5,779,265 A | 7/1998 | Rose et al. |
| 5,813,693 A | 9/1998 | Gordon et al. |
| 5,839,755 A | 11/1998 | Turnbull |
| 5,848,805 A | 12/1998 | Sogi et al. |

(List continued on next page.)

FOREIGN PATENT DOCUMENTS

| | | | |
|---|---|---|---|
| DE | 43 06 615 | * | 9/1994 |
| JP | 08-72648 | * | 3/1996 |
| JP | 08-188112 | * | 7/1996 |
| JP | 10-76908 | * | 3/1998 |
| JP | 2001-277992 | * | 10/2001 |

*Primary Examiner*—Paul N. Dickson
*Assistant Examiner*—Deanna Draper
(74) *Attorney, Agent, or Firm*—Gary A. Smith

(57) ABSTRACT

An air bag deployment system for a vehicle having an air bag cushion having at least one pyrotechnic vent, an inflator in communication with the air bag cushion for inflating the air bag cushion, at least one sensor, and a restraint control module electrically connected to the pyrotechnic vent and the at least one sensor. The restraint control module being operative to receive and analyze a signal from the at least one sensor and to signal the pyrotechnic vent to deploy thereby allowing gas to vent from inside the air bag cushion.

18 Claims, 1 Drawing Sheet

U.S. PATENT DOCUMENTS

| | | | |
|---|---|---|---|
| 5,853,192 | A | 12/1998 | Sikorski et al. |
| 5,871,231 | A | 2/1999 | Richards et al. |
| 5,882,036 | A | 3/1999 | Moore et al. |
| 5,887,894 | A | 3/1999 | Castagner et al. |
| 5,918,901 | A | 7/1999 | Johnson et al. |
| 5,941,557 | A | 8/1999 | Mullins, Jr. et al. |
| 5,947,512 | A | 9/1999 | Magoteaux et al. |
| 5,967,551 | A | 10/1999 | Newkirk et al. |
| 5,988,677 | A | 11/1999 | Adomeit et al. |
| 5,997,037 | A | 12/1999 | Hill et al. |
| 6,022,046 | A | 2/2000 | Isomura et al. |
| 6,053,527 | A | 4/2000 | Gans et al. |
| 6,056,318 | A * | 5/2000 | Braunschadel .............. 280/739 |
| 6,082,765 | A | 7/2000 | Bowers et al. |
| 6,086,096 | A | 7/2000 | Link et al. |
| 6,131,943 | A | 10/2000 | Breitweg |
| 6,142,517 | A * | 11/2000 | Nakamura et al. .......... 280/739 |
| 6,158,770 | A * | 12/2000 | Ryan et al. ................. 280/736 |
| 6,170,859 | B1 | 1/2001 | Kausch |
| 6,179,322 | B1 | 1/2001 | Faigle et al. |
| 6,183,003 | B1 * | 2/2001 | Matsuhashi et al. ..... 280/728.2 |
| 6,189,924 | B1 | 2/2001 | Hock |
| 6,189,926 | B1 * | 2/2001 | Smith ......................... 280/737 |
| 6,206,408 | B1 | 3/2001 | Schneider |
| 6,206,417 | B1 | 3/2001 | Soderquist et al. |
| 6,224,583 | B1 | 5/2001 | Perkins et al. |
| 6,241,283 | B1 | 6/2001 | Zarazua |
| 6,250,677 | B1 | 6/2001 | Fujimura |
| 6,254,121 | B1 | 7/2001 | Fowler et al. |
| 6,254,129 | B1 | 7/2001 | Rink et al. |
| 6,254,130 | B1 | 7/2001 | Jayaraman et al. |
| 6,290,257 | B1 * | 9/2001 | Bunce et al. ............... 280/739 |

* cited by examiner

PYROTECHNIC AIR BAG STITCH VENT

BACKGROUND OF INVENTION

This invention relates to an occupant restraint system and, in particular, to an occupant restraint system having an air bag cushion with a vent.

Occupant restraint systems having air bag cushions are well known. During an impact of a predetermined severity, a restraint control module signals the inflator to inflate an air bag cushion to protect an occupant. There are times, however, when the air bag cushion inflates to a higher pressure and creates a larger force than desired or needed such as when the vehicle occupant is out of position or properly belted or when the collision is of a lesser severity.

Various solutions have been developed to decrease the internal pressure inside the air bag cushion by venting the gas inside the air bag cushion. Automatic vents have been installed on air bag cushions that open when a certain predetermined internal pressure has been reached. One example of such a vent is disclosed in U.S. Pat. No. 5,219,179, issued to Eyrainer et al. In Eyrainer, a predefined relief opening is designed to tear at a predetermined internal air bag pressure to provide damping action. However, other factors, such as a small-statured, buckled, or an out-of-place occupant, may require venting the air bag cushion at a pressure lower than the predetermined pressure of the automatic relief opening and in a more time-controlled manner or fashion. Further, the predetermined relief opening can only open in a set manner creating limited air bag geometries and internal pressures regardless of what the optimum air bag geometry would be for the particular occupant and crash conditions.

Accordingly, there is a need to provide an air bag cushion that is capable of venting depending on factors such as whether the occupant is buckled, the size and position of the occupant, and the severity of the crash, and that is able to produce multiple air bag cushion geometries and/or internal pressures.

SUMMARY OF INVENTION

Accordingly, it is an object of this invention to provide a vehicle occupant restraint system having an air bag cushion venting system that vents based on factors other than a predetermined internal air bag cushion pressure.

It is another object of this invention to employ an air bag cushion venting system that can provide time-dependent venting at strategic locations and instances in the crash event.

It is a further object of this invention to provide an air bag cushion venting system that produces variable air bag cushion geometries and controlled internal pressures to accommodate different vehicle occupants under variable conditions.

Accordingly, this invention features an air bag deployment system for a vehicle having an air bag cushion having at least one pyrotechnic vent, an inflator in communication with the air bag cushion for inflating the air bag cushion, at least one sensor, and a restraint control module electrically connected to the pyrotechnic vent and the at least one sensor. The restraint control module being operative to receive and analyze a signal from the at least one sensor and to signal the pyrotechnic vent to deploy, thereby allowing gas to vent from inside the air bag cushion.

These and other objects of the invention will be more readily apparent upon reference to the following detailed description.

DETAILED DESCRIPTION

Referring now to FIGS. 1–4, an air bag module 1 comprises in its most basic form an inflator 30 and an air bag cushion 10. The air bag cushion 10 is usually stored in a folded state (not shown) to minimize storage requirements. A cover having a tear seam (not shown) generally covers the air bag cushion 10 while it is in its pre-deployed state. During the deployment of the air bag cushion 10, the tear seam tears open and the air bag cushion 10 bursts through the cover to protect the vehicle occupant (not shown). Deployment doors that fold away from deploying air bag cushion may also be used. The inflator 30 inflates the air bag cushion 10 with gas using known methods. However, the exact method of communication between the inflator and the air bag cushion is not relevant to this invention as long as the inflator can inflate the air bag cushion.

Figure 1:
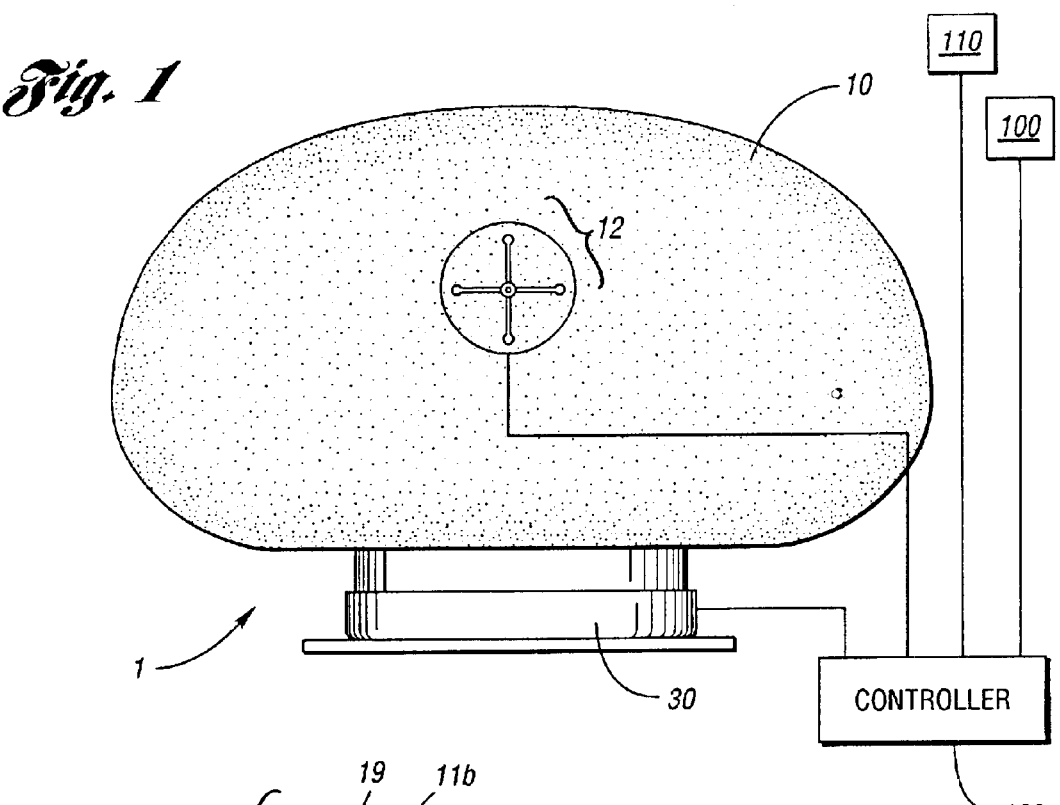
FIG. 1 is a view of an occupant restraint system of the present invention having an air bag cushion with a pyrotechnic vent.
Figure 2:
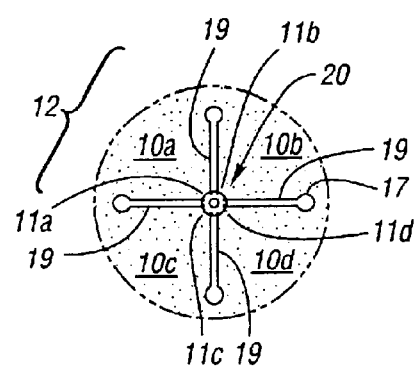
FIG. 2 is a detailed plan view of the pyrotechnic vent of the present invention.
Figure 3:
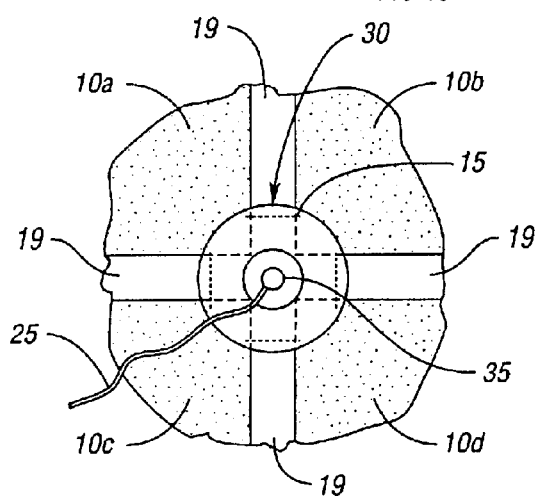
FIG. 3 is a detailed view of the pyrotechnic vent of the present invention.
Figure 4:
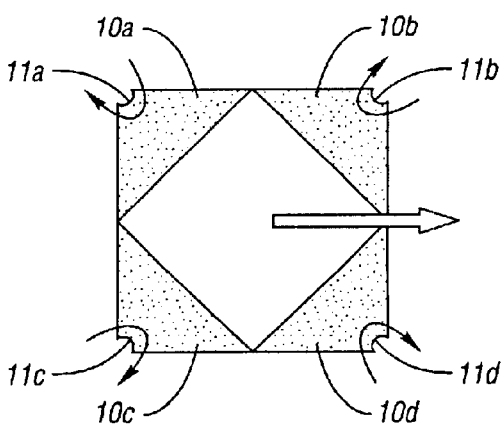
FIG. 4 is a detailed view of the pyrotechnic vent of the present invention after it has opened.

As shown in FIGS. 2 and 3, the air bag cushion 10 comprises at least one pyrotechnic vent 12 on its surface to allow selective venting of gas from inside the air bag cushion 10. The pyrotechnic vent 12 can be made on the air bag cushion 10 itself or preferably manufactured separately and attached to the air bag cushion. The pyrotechnic vent 12 preferable comprises four cutouts 19 that separate the pyrotechnic vent into four flaps 10a, 10b, 10c, and 10d each having a free end 11a, 11b, 11c, and 11d. However, the pyrotechnic vent 12 can also be made with more or fewer cutouts 19 and flaps 10. Stress relief holes 17 may be placed at the end of cutouts 19 to minimize stress and control tearing of the air bag cushion 10 when the pyrotechnic vent 12 opens. A pyrotechnic pouch 20 containing an explosive charge is attached proximate the intersection of the cutouts 19. Preferably, stitching 15 is used to keep the pyrotechnic pouch 20 in place and the four flaps closed for normal deployment of the air bag cushion 10. Other securing means, such as adhesive, may also be used for securing the pyrotechnic pouch 20. An igniter 35 is attached to the pyrotechnic pouch 20 to ignite the explosive charge. An electrical line 25 connects the igniter 35 with the restraint control module 120 which provides the electric charge to cause the igniter 35 to ignite the pyrotechnic pouch 20 and blow open the pyrotechnic vent 12 as shown in FIG. 4.

During and/or before a collision, vehicle occupant sensors 100 disposed on the vehicle sense various occupant characteristics such as their size, whether or not they are properly belted, if they are out of position, seat on track position, and classification of the occupants including their height and weight. These sensors can include, for example, mechanical limit switches, infrared sensors, ultrasound sensors, photo/vision sensors, and load sensors. Vehicle sensors 110 also disposed on the vehicle sense various vehicle and crash conditions such as the severity of the crash and the speed of the vehicle. A restraint control module 120 receives the signals from the occupant sensors 100 and vehicle sensors 110 and determines, first, if and when the air bag module should be deployed and, second, if additional venting is required.

If the restraint control module 120 determines that air bag deployment is necessary based on the information sensed from the sensors 100 and 110, the restraint control module 120 signals the inflator 30 to inflate the air bag cushion 10 with gas in a known manner. A minimal amount of gas may vent through cutouts 19 as the air bag cushion 10 inflates.

If the restraint control module 120 determines that venting is required based on the input from sensors 100 and 110, the restraint control module 120 sends a signal to the igniter 35 via electrical line 25 causing the igniter to detonate the pyrotechnic pouch 20. When the pyrotechnic pouch explodes, the ends of the flaps 10a, 10b, 10c, and 10d are freed and open as shown in FIG. 4 to allow venting. Accordingly, the air bag cushion 10 softens.

Additional pyrotechnic vents 12 may be placed on the air bag cushion 10 to control the shape and internal pressure of the deploying air bag cushion. For instance, there may be three pyrotechnic vents 12 placed on an air bag cushion 10 in which one or more vents may be employed to control the internal pressure. Based on the information received from the sensors, the restraint control module 120 determines the optimal configuration and internal pressure of the deployed air bag cushion for a particular set of crash conditions and occupant characteristics. By having various pyrotechnic vents 12 on the air bag cushion 10, multiple air bag configurations and internal pressures could be created. Additionally, the restraint control module 120 could control the timing of the opening of the pyrotechnic vents 12 to provide the optimally shaped and pressurized air bag cushion 10 for the particular conditions.

The amount of venting can be tuned by, for example, modifying the size of cutouts 19 and flaps 10 to create larger or smaller pyrotechnic vents 12, the position of the pyrotechnic vents 12, the number of vents, and the timing of the detonation of the pyrotechnic pouches 20.

While the best mode for carrying out the invention has been described in detail, those familiar with the art to which this invention relates will recognize various alternative designs and embodiments for practicing the invention as defined by the following claims.

What is claimed is:

1. An air bag deployment system for a vehicle comprising:
    an air bag cushion having at least one pyrotechnic vent disposed on the airbag cushion;
    an inflator in communication with the air bag cushion for inflating the air bag cushion;
    at least one sensor; and
    a restraint control module electrically connected to the pyrotechnic vent and the at least one sensor, the restraint control module being operative to receive and analyze a signal from the at least one sensor and to signal the pyrotechnic vent to deploy thereby allowing gas to vent from inside the air bag cushion.

2. The air bag deployment system of claim 1 wherein the pyrotechnic vent comprises a plurality of cutouts defining a plurality of flaps, each flap having a free end;
    a pyrotechnic pouch attached to the free ends of the flaps; and
    an igniter electrically connected to the restraint control module for igniting the pyrotechnic pouch.

3. The air bag deployment system of claim 2 wherein the pyrotechnic vent comprises four flaps.

4. The air bag deployment system of claim 2 wherein the pyrotechnic pouch is sewn to the free ends of the flaps.

5. The air bag deployment system of claim 1 wherein the system comprises at least one sensor to sense occupant characteristics.

6. The air bag deployment system of claim 1 wherein the system comprises at least one sensor to sense vehicle and crash conditions.

7. The air bag deployment system of claim 1 wherein the system comprises at least one sensor to sense occupant characteristics and at least one sensor to sense vehicle and crash conditions.

8. An air bag module comprising:
    an air bag cushion having at least one pyrotechnic vent disposed on the airbag cushion; and an inflator in communication with the air bag cushion for inflating the air bag cushion.

9. The air bag module of claim 8 wherein the pyrotechnic vent comprises a plurality of cutouts defining a plurality of flaps, each flap having a free end; a pyrotechnic pouch attached to the free ends of the flaps; and an igniter.

10. The air bag deployment system of claim 9 wherein the pyrotechnic vent comprises four flaps.

11. The air bag module of claim 9 wherein the pyrotechnic pouch is sewn to the free ends of the flaps.

12. A method of deploying an air bag for a vehicle comprising:
    activating an inflator to inflate the air bag cushion;
    deploying a pyrotechnic vent disposed on the air bag cushion in response to a signal from at least one sensor, said deployment forming an opening in the air bag cushion to allow gas to vent from inside the air bag cushion.

13. The method of claim 12 wherein the step of deploying the pyrotechnic vent comprises utilizing a restraint control module electrically connected to the pyrotechnic vent and the at least one sensor, the restraint control module being operative to receive and analyze the signal and to command the pyrotechnic vent to deploy.

14. The method of claim 12 wherein the pyrotechnic vent comprises a plurality of flaps and a pyrotechnic pouch, and the step of deploying the pyrotechnic vent comprises igniting the pyrotechnic pouch to release the flaps.

15. The method of claim 14 wherein the pyrotechnic pouch is sewn to free ends of the flaps.

16. The method of claim 14 wherein the pyrotechnic pouch is ignited by a signal from a restraint control module.

17. The method of claim 12 wherein the signal from the at least one sensor indicates occupant characteristics.

18. The method of claim 12 wherein the signal from the at least one sensor indicates vehicle and crash conditions.

* * * * *